UNITED STATES PATENT OFFICE 2,595,616

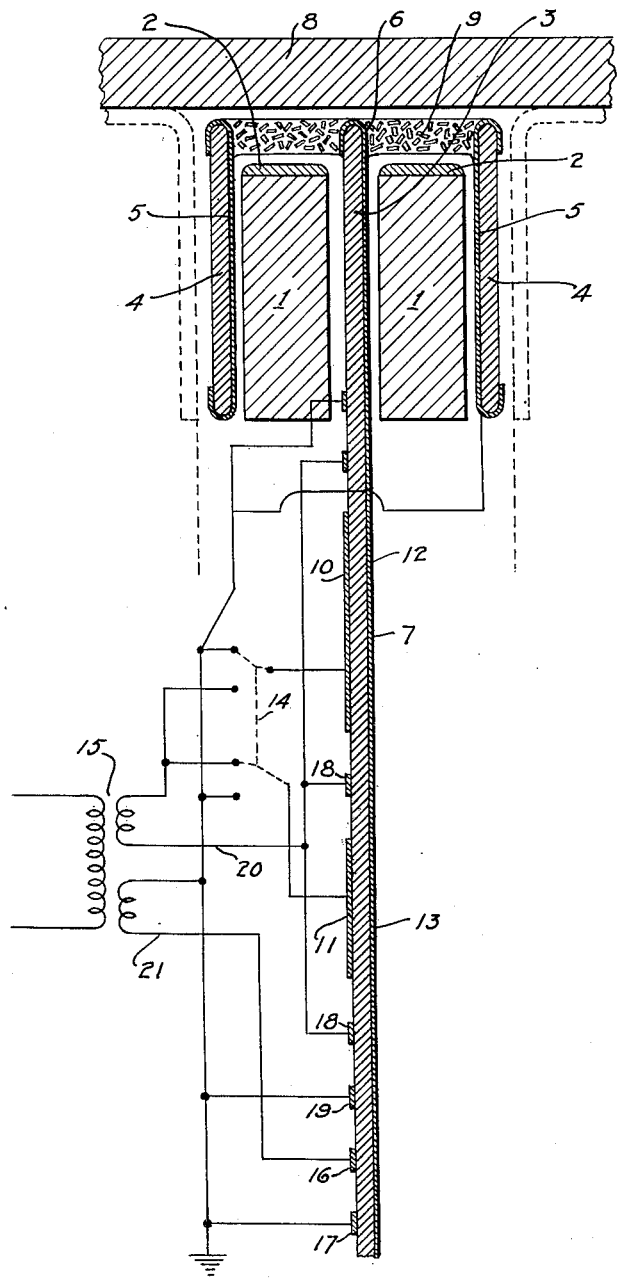

LIGHT DIFFUSING SURFACE MADE OUT OF ELECTROOPTICAL ELEMENTS CONTROLLED ELECTROSTATICALLY

Pierre Marie Gabriel Toulon, Paris, France, assignor to Products & Licensing Corporation, New York, N. Y., a corporation of Delaware Application August 4, 1947, Serial No. 766,038
In France February 17, 1942

Section 1, Public Law 690, August 8, 1946
Patent expires February 17, 1962

8 Claims. (Cl. 88—61)

My invention relates to a new electro-optical element, to be looked at from its front side, and capable of diffusing in a variable manner the amount of light which falls thereon. It applies more particularly to the constitution of electro-optical elements apt to be modulated electrostatically, i. e. by the effect of an applied voltage, but with practically no current consumed.

A known property of certain colloidal substances consists in taking a marked orientation under the effect of an electrostatic field. Another property, which is also manifested by a few of the same colloidal substances, consists in polarizing an incident light.

If the electrostatic field applied to such colloidal substances is progressively reduced, therefrom results a progressive reduction of the proportion of the light which passes through the solution.

My invention is based on the utilization of these phenomena, and it aims at obtaining an element of surface capable of diffusing more or less of the incident light according to the value of the applied electrostatic tension: such is the basis principle of the new electro-optical element according to the present invention.

For illustrating that principle, a glass tank containing a suitable colloidal solution is placed opposite a white surface which diffuses an incident light, the source of which is so disposed that its light rays, falling on the front face of the tank and into the solution, are, on their going and return through it, absorbed to an extent which is a function of an applied electrostatic potential of control.

The present invention makes use of those dispositions for obtaining a screen surface made of elementary areas (or electro-optical elements) the aspect of which can be locally modified.

The electrostatic field is applied perpendicularly to that screen surface, by means of electrodes which are in the edgewise direction with reference to the spectators, so that their visibility is a minimum. The tank containing the colloidal liquid has a large relative area and a very small thickness and it is hermetically closed. Its front face is transparent and its rear face, which is white opaque, is an active diffuser of the incoming light.

A light control similar to that contemplated herein could be effected by a "transparency" light valve, that is, one in which a light source is placed on one side of the light valve while the observer is on the other side.

Such a disposition is far from being practical, as it is very inconvenient to place at the rear of a screen the electrodes and the supply conductors. Moreover, if the problem is to install a receiving television screen to be used in full daylight, the transparency light valve is still more unacceptable for several reasons; first, the ambient diurnal light undergoes very large variations, which necessitate correspondingly large variations of output of the light sources placed behind the light valves. Secondly, the energy consumption of the lighting sources is considerable and they develop a very objectionable heating. Thirdly, the space existing at the rear of the light valve components of the screen is necessarily reserved for the lighting lamps; and cannot be spared for the valve supplying devices and accessories, namely the static glow discharge distribution system described in my U. S. Patents 2,474,338 and 2,471,253.

The object of my present invention is to create a new class of light valves, operating by diffusion of the incident light, and individually modulated so that they would be the very valuable components of any projection screens.

An individual light valve of that sort comprises a white light diffusing surface, in front of which is placed another substance, the transparency and even the colour of which are varied by means of a controlled electrostatic tension. A convenient chemical substance for the modulation of the incident light may be liquid, gaseous or solid, but my researches have led me to presently use the cobalto-amines by preference to the other substances. The transparency of my light valves is varied by modification, either of the orientation of the colloidal elements, or of the concentration, or by the migration of the colored centers.

Special dispositions of containers and electrodes are of particular advantages and are, therefore, specified in my application.

Another object of my present invention relates to the constitution of a television receiving screen, composed by means of the above elementary light valves.

Another object of my invention is to provide appropriate means of modulation for the above electro-optical elements.

The desired modulation can be made by means of electrostatic induction by capacity, from one or several current distributions permitting the appearance on the screen of one or several pictures.

My invention is also applicable to posters and advertising pictures. The modulation of the electro-optical elements can be made by means of a static distributor, to which the electrodes are directly connected.

For a better understanding of my invention, reference will be made to the appended drawing and to the corresponding description, both of them of an illustrative and not a limitative character:

The figure represents a sectional fractional view of a screen visible in daylight, which comprises as a light modulating element a colloidal liquid polarising the light when electrostatically orientated.

The screen shown in sectional view in the figure comprises a very large number of cardboard paper bands 1; the edges of which are coated with an insoluble white varnish 2 and stacked edgewise. Those bands 1 are separated by thin bakelised paper sheets 3 which slightly overlap the bands 1 on the front side. On each of those paper sheets 3 have been deposited conducting parallel coatings 6, so that each of the said coatings represents a small independent conducting band. The coating may be made of aquadag, on which is effected a scraping perpendicular to the direction of the band. The coating can also be made by silvering or by photographic means. Use is then made of a great contrast emulsion, on which parallel bands are printed photographically from a negative; the parts impressed are made conducting by treatment with the bichloride of mercury. Use may also be made of the bichromate gelatine process or the bromoil process, which deposit a suitable ink upon which is scattered a conducting substance (aluminium powder or an equivalent material). The bands (1—3) thus assembled are interleaved with sheets of bakelised paper 4 which are rendered conducting in their whole length by means of coatings 5 and grounded. The bands 3 and 4 are disposed in an alternate way.

Each one of the paper sheets 3 and their adherent coatings 6 extend behind the screen so as to receive a modulation corresponding to each of the points of the picture undergoing reproduction. These modulating tensions created either by electrostatic induction, or by direct conduction, are so chosen as to provide the various conducting coatings 6 with the suitable potential.

From the front face are seen the edges of the conducting coatings 6 which alternate with two grounded electrodes 5 both representing metallic armatures which permit to create, tangentially to the surface of the screen, an electrostatic field varying with the potential applied to the electrodes (6 and 5). The screen is closed on its front face by a glass plate 8, and in the interval between the glass plate 8 and the edges of the stacked components 1, is admitted the colloidal liquid 9, the colloids of which are apt to be orientated electrostatically. The components 1, 3 and 4 are united so as to form a continuous surface by means of a glue polymerisable by heating, such as a Bakelite or a gelatine varnish.

When they are intended for a television screen, the components 6 receive the modulation originating from a glow discharge distributor made according to my United States Patents 2,474,338 and 2,471,253.

My invention applies also to the realisation of a movable screen, of particular use, for instance, in view of advertising purposes: for instance several pictures may appear, in succession, at the same place, on a screen (for instance several positions of one or several persons). Two such pictures can be displaced by translation so that they can be renewed.

I will now briefly discuss a conducting band disposition which permits the induction of suitable voltages on each one of the elements by capacitive effect. The bands 7 extend to the rear face of the screen, opposite the bands 10 and 11. The potential applied to bands 10 and 11 can be changed by means of a transformer 15 and a reversing device such as the two-way switch 14.

For producing a first picture, a potential is applied to the band 10, and the band 11 grounded. A second picture appears when the band 10, on the contrary, is grounded, and a potential is applied to the band 11 (as done in the figure by the reversing switch 14).

The conducting bands 10 and 11 are preferably laid on independent paper sheets, so as to obtain an easy realization of those bands and facilitate their displacement with regard to the supporting sheet 3. Their length may largely exceed the dimension of the screen. In view of their displacement, their extremities are set on rolls, the bands are rolled together thereon, and they can be drawn simultaneously from one side or the other when wishing to displace them or to renew the picture.

The system can be improved by the addition of auxiliary bands 18 connected to a suitable potential source 20 obtained from the transformer 15, and by the addition of grounded bands 19. These additional bands are useful for distributing the potential on the insulating surface, and for reducing the losses resulting from insufficiency of insulation. An auxiliary band 16, coupled to a potential 21, in phase-opposition with the main supply voltage, compensates the unavoidable parasitic capacities and improves the operation of the system.

The light intensity of each point of the picture is controlled on the first picture by the ratio of opposite surfaces 10 and 7, since these surfaces determine the potential on the electrode 6. For the second picture, the intensity is determined by the ratio of opposite surfaces 11 and 17.

The above described screen utilising the electrostatic orientation of polarising colloidal crystals results in obtaining only black and white pictures when operated in daylight. On the contrary, colored pictures can be obtained if operated under artificial light; for that, it is sufficient to use several light sources corresponding to fundamental complementary colors, for instance successive lights in which the red, the blue, and the yellow are in rapid succession. The modulation of the elements being applied in synchronism with each of the tints successively, the screen will appear with its proper value.

What I claim is:

1. A color screen comprising, a plurality of cells, each of said cells arranged for diffusedly reversing direction of travel of light passing therein, each of said cells containing a medium translucent selectively to light of different wave lengths in accordance with the intensity of an electric field in said medium, each of said cells further including a diffusing wall for diffusedly reversing the direction of light which has passed therein, and means for applying controllable intensities of electric field selectively to said cells.

2. A light screen comprising a plurality of cells, each of said cells defined by a plurality of walls terminating in substantially a common plane, said walls having each a conducting coating, a colloidal medium having opacity to diffused light which is responsive to electric field intensity, said colloidal medium substantially filling each of said cells, a transparent screen resting on said walls in said common plane, a light diffusing surface providing an additional wall of each of said cells displaced from and parallel to said transparent screen, and means for applying controllable voltage between said conductive coatings to vary the opacity of the colloidal medium in said cells.

3. A light intensity control system comprising a cell having a light reflecting diffusing surface and a layer of a colloidal medium the opacity of which varies in response to the intensity of an electrostatic field, means adjacent said cell producing a variable electrostatic field for controlling the opacity of said medium, said layer of colloidal medium covering said reflecting diffusing surface, the amount of light passing through said colloidal medium to said reflecting surface being dependent upon the opacity of said medium, said light being diffusedly reflected by said surface and passing back through said medium.

4. The control system of claim 3 in which said cell includes a face surface transparent to light, and boundary surfaces substantially perpendicular to said face surface, said means producing a variable electrostatic field including conductive deposits upon said boundary surfaces.

5. The system of claim 4 in which said conductive deposits comprise a plurality of conductive strips respectively parallel to one another, said means producing a variable electrostatic field further including potential distribution means coupled to said strips.

6. The system of claim 5 in which said light reflecting diffusing surface is a further boundary surface substantially parallel to said face surface.

7. A light screen comprising a plurality of light control cells, each of said cells having a transparent face surface and boundary walls substantially perpendicular to said face surface, each of said cells further including a light reflecting diffusing surface substantially parallel to said face surface, a colloidal medium in each of said cells, between said face surface and said reflecting diffusing surface, the opacity of which varies in response to the intensity of an electrostatic field, and means producing a variable electrostatic field in said colloidal medium comprising conductive deposits on said boundary walls and potential distribution means coupled to said conductive deposits for selectively varying the opacity of colloidal medium in said cells, the amount of light passing through said colloidal medium to said reflecting surface in each of said cells being dependent upon the opacity of medium in said cell, said light being diffusedly reflected by said surface and passing back through said medium in each of said cells.

8. The system of claim 7 in which said light screen is a color screen, said system including means for successively illuminating said color screen with light of different predetermined wavelengths.

PIERRE MARIE GABRIEL TOULON.

REFERENCES CITED

The following references are of record in the file of this patent:

UNITED STATES PATENTS

| Number | Name | Date |
|---|---|---|
| 1,740,673 | Whitaker et al. | Dec. 24, 1929 |
| 1,894,462 | Davis | Jan. 17, 1933 |
| 1,963,496 | Land | June 19, 1934 |
| 2,000,379 | Deisch | May 7, 1935 |
| 2,000,380 | Deisch | May 7, 1935 |
| 2,002,515 | Worrall | May 28, 1935 |
| 2,163,550 | Clothier et al. | June 20, 1939 |
| 2,341,422 | Bubb | Feb. 8, 1944 |

FOREIGN PATENTS

| Number | Country | Date |
|---|---|---|
| 241,636 | Great Britain | Oct. 26, 1925 |
| 673,696 | France | Jan. 17, 1930 |